A. J. HOLMES.
INDUCTION WATER HEATER.
APPLICATION FILED MAY 6, 1919.

1,425,968.

Patented Aug. 15, 1922.
2 SHEETS—SHEET 1.

Inventor
ANDREW J. HOLMES

By Reynolds H Cook
Attorney

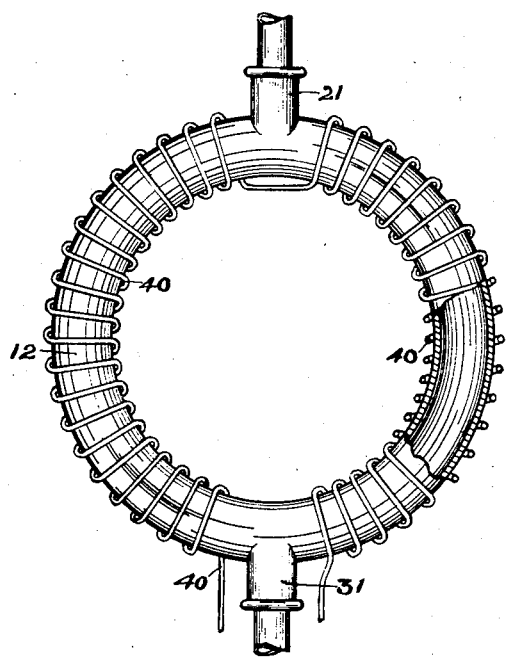

UNITED STATES PATENT OFFICE.

ANDREW J. HOLMES, OF TACOMA, WASHINGTON, ASSIGNOR TO BIG-FOUR ELECTRIC COMPANY, OF TACOMA, WASHINGTON, A CORPORATION OF WASHINGTON.

INDUCTION WATER HEATER.

1,425,968.  Specification of Letters Patent.  Patented Aug. 15, 1922.

Application filed May 6, 1919. Serial No. 295,167.

*To all whom it may concern:*

Be it known that I, ANDREW J. HOLMES, a citizen of the United States, and resident of the city of Tacoma, county of Pierce, State of Washington, have invented certain new and useful Improvements in Induction Water Heaters, of which the following is a specification.

My invention relates to improvements in induction water heaters and relates more particularly to improvements in the type of induction water heater disclosed in the patent to Charles A. Backstrom, issued April 2, 1918, No. 1,261,470, and the object of my invention is to provide an induction water heater wherein the power factor thereof is increased to the maximum by providing a continuous or integral metallic body for the magnetic circuit of the said heater.

Another object is to provide an induction water heater wherein the elements comprising the secondary or magnetic circuit thereof are formed integral with one another, to thereby eliminate any interruptions in the said circuit and to also eliminate or avoid the magnetic hum inherent in heaters of the induction type.

A further object is to provide an induction water heater wherein the water to be heated is adapted to come in direct contact with the heated walls or secondary circuit of the said heater.

A still further object is to provide an induction water heater wherein the maximum amount of heat generated in the said heater, is transmitted to the water flowing upwardly therethrough.

A still further object is to provide an induction water heater embodying simplicity, durability and economy in construction, that is positive and efficient in operation, and that will not readily get out of order.

With the above and other objects in view which will appear as the description proceeds, my invention resides in the novel construction, combination, adaptation and arrangement of parts hereinafter described and succinctly defined in the appended claims.

I accomplish these objects by devices illustrated in the accompanying drawings, wherein:—

Figure 3 shows my invention embodied in a device differing in shape, although being in principle the same.

Figure 1:
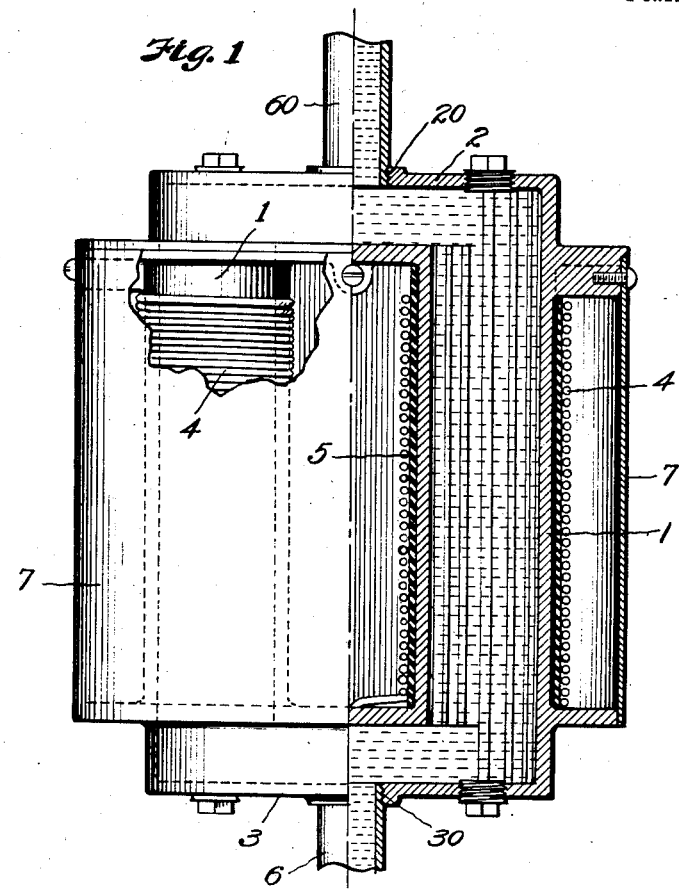
Figure 1 is a side view of the heating element, one side being in section upon a central plane.
Figure 2:
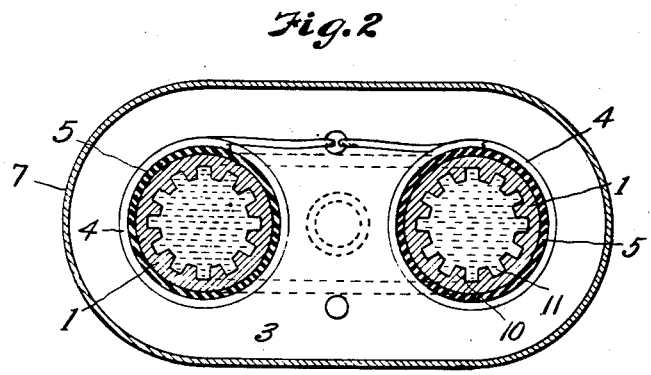
Figure 2 is a transverse section taken through the central portion thereof.

My heater, as illustrated in Figures 1 and 2, employs two parallel hollow cores 1, which are integrally connected by hollow heads 2 and 3, about which cores the primary conductors 4 are wound and through which cores the liquid to be heated is caused to flow, one head having an inlet opening 30 and the other a discharge opening 20. As shown in Figure 3 the cores are curved so as, together, to form a ring.

The cores, 1, and the heads 2 and 3, are made as an integral body and of magnetic metal, thus avoiding any joints and the obstruction to the electric current caused by joints. A pulsating or alternating current in the primary windings 4, induces pulsating or alternating currents in the core. The two cores with the heads 2 and 3, form a closed circuit for these induced currents, this circuit being without any joint and preferably proportioned to have substantially equal carrying capacity at all points, forms an unrestricted path for the current, and in operation is not likely to produce any material humming or audible sound.

I prefer to make the cores ribbed or channeled interiorly, after the manner shown by ribs 10 and channels 11 in Fig. 2. These ribs may be disposed in any other direction found suitable, as in a spiral form. There are two principal reasons for this. By this construction the liquid is brought closer to the outer surface of the core, where the most active electrical heating effects take place, while at the same time the area of section required as a current conductor is maintained. This ribbed or fluted surface also gives greater heat transferring surface, and reinforces the area of the current carrying section.

Each core with the attached heads acts as the magnetic return channel for the other core, thereby dispensing with the necessity for any external magnetic path. These currents and the heating effects which they produce are all kept within the metal which is in close contact with the liquid which is to be heated, whereby there is a more efficient and thorough transfer of heat to the liquid.

Between the cores 1 and the primary coil 4 are placed insulating layers 5, which may be of an asbestos compound, or other heat-resistant electric insulator.

This heater is placed in a liquid circulation system, 6 representing the supply pipe and 60 the discharge pipe. In consequence there is a flow of liquid induced as soon as heat transfer to the liquid begins. It will therefore operate efficiently to heat considerable bodies of liquid contained in tanks or other receptacles with which it may be connected.

While I have described this device as being used to heat liquids it is evident that it may be used to heat air or gases. This may be passed through the interior of the heads and cores and the exterior also will provide a certain heating effect.

As shown in Figure 3, this heater may be made as a hollow circular ring, 12, having an inlet neck 31 and an outlet neck 21, and a primary conductor 40 passing about the same. This will, in principle act exactly as will the construction shown in Figures 1 and 2. As all of the metal which forms the induced or secondary circuit is within the primary coil and in direct contact with the fluid, there is no loss of heat generated by radiation. The device is therefore efficient and quick in action. It is also embodied in a shape which may be rapidly and cheaply made.

From the foregoing description taken in connection with the accompanying drawings, the advantages of construction and the method of operation of my induction water heater will be readily apparent to those skilled in the art to which my invention pertains, to thus enable those so skilled to construct and operate the same, but, while I have shown and described the construction and operation of an induction water heater embodying the features of my invention, which I now consider to be the best embodiment thereof, I desire to have it understood that the induction water heater shown is merely illustrative and that such changes may be made when desired as are within the scope of my invention and embodied in the appended claims.

What I claim as my invention is:

1. In an induction water heater, a unitary metallic body comprising a plurality of tubular cores, hollow heads adapted to integrally connect and communicate with said tubular cores at the adjacent ends thereof, said unitary metallic body constituting the secondary circuit of said heater; a supply pipe adapted to communicate with one of said hollow heads; a discharge pipe adapted to communicate with the other of said hollow heads; and primary coils adapted to be disposed around said tubular cores.

2. In an induction water heater, a unitary metallic body having a plurality of integral tubular cores extending from the inlet end to the outlet end thereof, said unitary metallic body constituting a continuous and integral secondary circuit for said heater; and primary coils adapted to be disposed around said tubular cores.

3. A unitary metallic body constituting the secondary circuit for an induction water heater comprising a plurality of tubular cores disposed in parallel relation, hollow heads adapted to integrally connect and communicate with said tubular cores at the adjacent ends thereof, and inlet and outlet means for the water circulating through said body.

Signed at Tacoma, Washington, this 23rd day of April, 1919.

ANDREW J. HOLMES.